Patented Jan. 11, 1927.

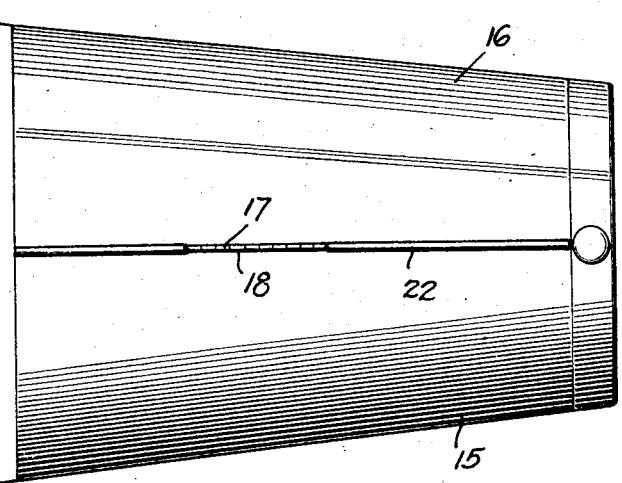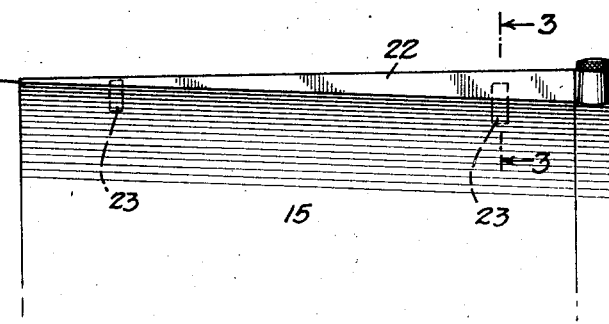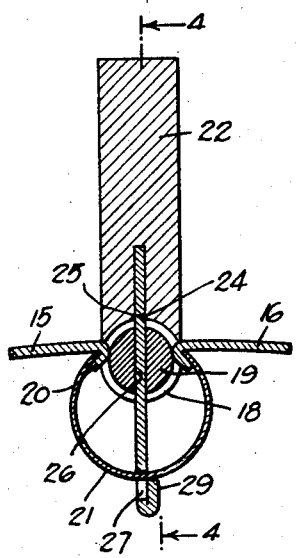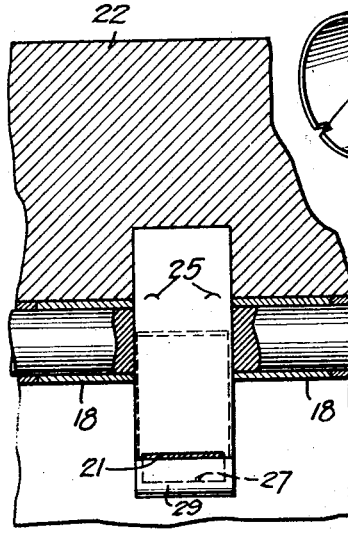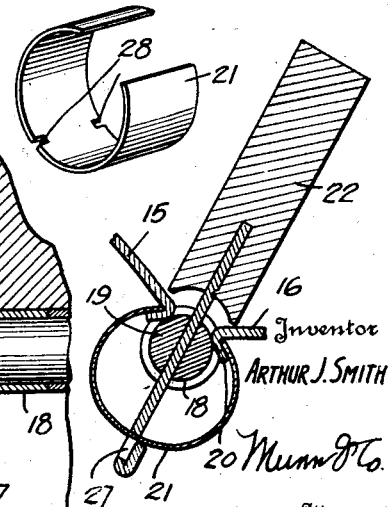

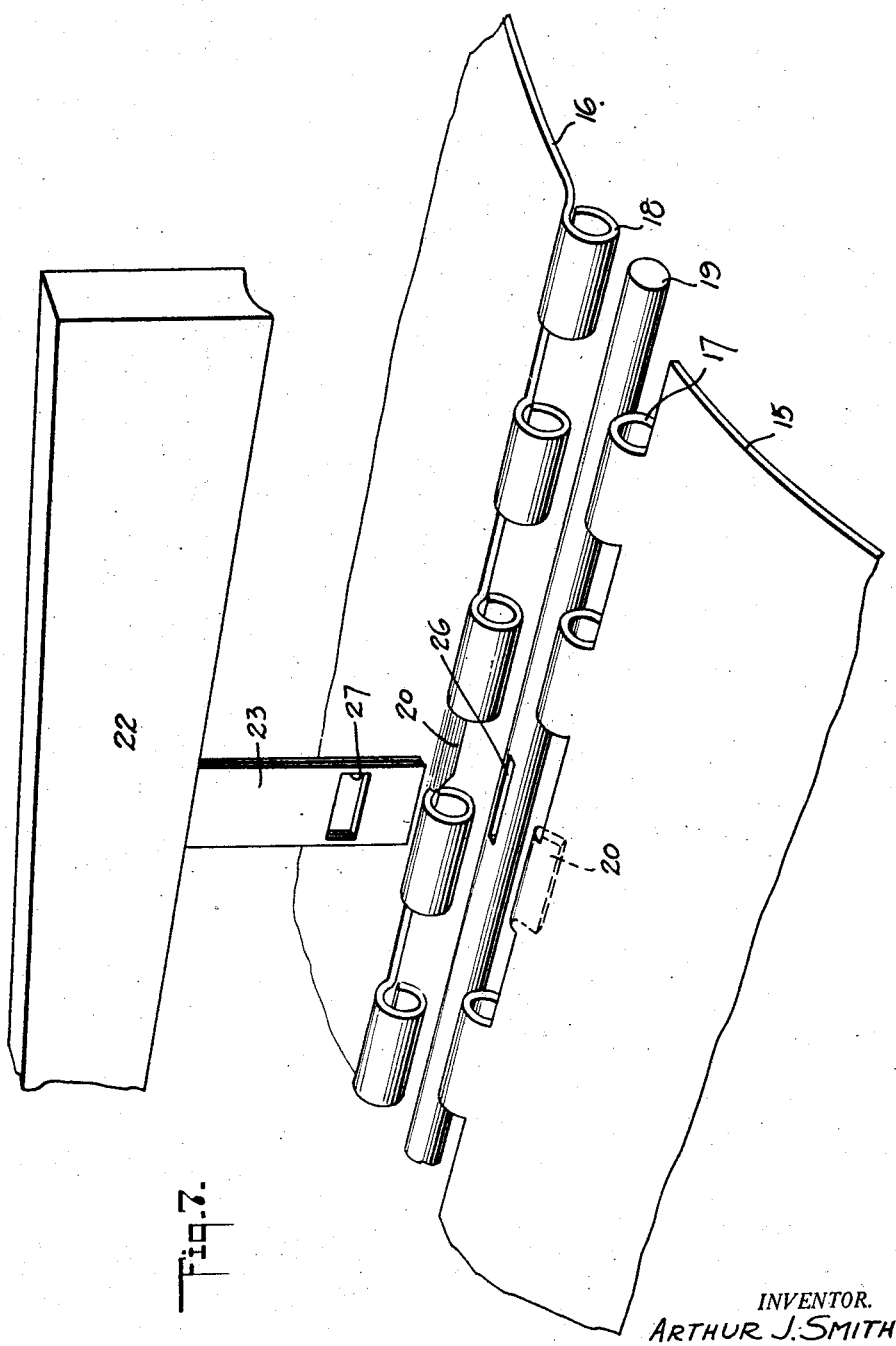

1,613,912

UNITED STATES PATENT OFFICE.

ARTHUR J. SMITH, OF LOS ANGELES, CALIFORNIA.

ATTACHMENT FOR AUTOMOBILE HOODS.

Application filed November 6, 1924. Serial No. 748,197.

My invention relates to and has for its purpose the provision of an attachment for automobile hoods by which the contour or lines of the hood will be changed in appearance as desired, depending upon the shape of the attachment employed. For example, in the present embodiment of my invention, the attachment includes a plate or bar which is tapered from end to end and in such manner that when applied to a hood sloping downwardly toward the radiator, it will cause the sloping hood to appear truly horizontal and thus produce the effect of a hood having streamlines.

A further object of the invention resides in the provision of means for elevating the attachment out of engagement with each individual hood section, when the latter are adjusted to gain access to the motor.

I will describe only one form of hood attachment embodying my invention, and will then point out the novel features thereof in claims.

In the drawings

Figure 1 is a view showing in top plan one form of attachment embodying my invention in applied position with respect to a hood;

Figure 2 is a view similar to Figure 1, but showing the attachment and hood in side elevation;

Figure 3 is a vertical sectional view taken on the line 3—3 of Figure 2;

Figure 4 is a vertical sectional view taken on the line 4—4 of Figure 3;

Figure 5 is a view similar to Figure 3, but showing the position which the attachment occupies when one of the hood sections is elevated;

Figure 6 is a detail perspective view of the spring embodied in the attachment shown in the preceding views;

Figure 7 is an enlarged fragmentary perspective view showing the hood and attachment disassembled.

Similar reference characters refer to similar parts in each of the several views.

Referring specifically to the drawings, my invention in its present embodiment is shown associated with an automobile hood tapered or sloping downwardly from the cowl to the radiator and is composed of two sections 15 and 16 hingedly connected at their upper edges to permit the same to normally occupy closed position, but to be elevated independently of each other for the purpose of gaining access to the engine beneath the hood. As illustrated in Figure 7, the means for hingedly connecting the hood sections 15 and 16 is conventional, the confronting edges of the sections being formed at intervals staggered with respect to each other with hinge sleeves 17 and 18, respectively. Loosely fitted in the sleeves when the latter are in longitudinally alined position is a hinge rod 19 which forms a pivot for the sleeves 17 and 18 so that the sections can swing about the rod as a center.

In carrying out my invention, the confronting edges of the hood sections 15 and 16 are formed at corresponding points along their length with lips or flanges 20 bent downwardly and inwardly, as clearly shown in Figure 3, to provide attaching means for springs 21. From a consideration of Figures 2 and 7, it will be clear that two pairs of lips or flanges 20 are provided adjacent the opposite ends of the hood and two springs 21, each spring being engaged at its ends by the corresponding pair of lips or flanges.

The main element of my attachment is a plate or bar 22, and this element in the present instance is co-extensive in length with the hood and tapered in height from its forward end to its rear end. This element may be formed of metal or other suitable material and is preferably finished in the same color as that of the hood so that when in applied position it will appear as an integral part of the hood. This plate or bar 22 is provided adjacent its opposite ends with depending arms 23 which are received in suitable slots formed in the plate and retained therein by punching the plate at points on its lower edge to form lugs 24 which project into suitable recesses 25 formed in the arms 23. As clearly shown in Figures 3 and 7, the plate 22 is concave on its lower edge so that when in applied position it will partly accommodate the hinge rod 19 and thus permit of its intimate association with the hood.

As shown in Figure 3, each arm 23 is extended through a slot 26 formed in the hinge rod 19 for the purpose of permitting its lower end to be associated with the corresponding spring 21. Each arm 23 is formed with a slot 27 through which the spring 21 extends, as shown in Figure 3.

The arm is fixed to the intermediate portion of the spring by recessing the latter, as indicated at 28, and beneath the spring the arm is bent upwardly to provide a lip 29 which operates as a further means for preventing relative movement of the arm and spring.

In practice, the plate 22 is supported in superimposed relation to the hinge connection of the hood sections, and by virtue of the arm 23 and the springs 21 the plate 22 normally occupies an upright position, as illustrated in Figures 1 and 2, that is, when the hood sections 15 and 16 are in closed position. By virtue of the tapered form of the plate 22, the upper edge of the hood is changed in appearance from a sloping line to a truly horizontal line, that is, when the hood is viewed in side elevation, thereby producing the effect of a hood of uniform height from end to end and thus producing the streamline effect desired.

Should it be desired to elevate one of the hood sections 15 or 16, the springs 21 are flexed to the form shown in Figure 5, wherein it will be seen that such flexing will operate to elevate the arms 23 through the hinge rod 19 and thus elevate the plate 22 sufficiently to clear the edge of that hood section which is elevated, thus avoiding any interference with the opening or elevation of the hood section. It is to be noted that the arms 23 are also moved laterally by the springs 21 so as to shift the plate 22 laterally in the same direction as the hood section is moved, and this shifting movement, together with the elevating movement, positively prevents any interference of the plate 22 with the opening or closing of the hood sections.

From the foregoing operation it will be manifest that the hood attachment, although normally functioning to change the esthetic appearance of the hood and consequently of the entire automobile body, permits the normal operation of the hood sections and its return to upright position upon the closing of both of the hood sections.

Although I have herein shown and described only one form of attachment for automobile hoods embodying my invention, it is to be understood that various changes and modifications may be made herein without departing from the spirit of the invention and the spirit and scope of the appended claims.

I claim:

1. As a new article of manufacture, an attachment for converting the lines of automobile hoods from sloping to the horizontal, comprising an elongated tapered member projecting upwardly and co-extensive in length with the hood.

2. As a new article of manufacture, an attachment for converting the lines of automobile hoods from sloping to the horizontal, comprising a bar secured to the hood in such manner as to permit independent movement of the sections thereof.

3. In combination, a sloping hood comprising sections having hinge rod connection, of a bar secured to the hinge rod and projecting upwardly from and co-extensive in length with the hood for converting the lines of the latter from sloping to horizontal, connecting means for the bar to the hinge rod and means for elevating the bar to permit the hood sections to be independently moved.

4. In combination, a hood including sections having hinge sleeves and a hinge rod extending through the sleeves and provided with slots, flanges on the sections adjacent the slots, a member, arms fixed to the member and extending through said slots, and resilient members secured to the flanges and to said arms in such manner that when either section is elevated the resilient members will operate to elevate the arms and consequently the member.

5. In combination, a hood including sections having hinge sleeves and a hinge rod extending through the sleeves and provided with slots, flanges on the sections adjacent the slots, a tapered plate above the hood and overlying the sleeves and rod, arms depending from the plate and extending through said slots, and springs secured to the flanges and to said arms in a manner and for the purpose described.

6. A combination as embodied in claim 5, wherein the arms extend into the plate and are provided with recesses to receive outstruck portions of the plate.

7. A combination as embodied in claim 5, wherein the arms are formed with slots to receive the springs, and lips engaging the springs to prevent movement of the latter within the slots, and said springs being notched to receive portions of the arms.

ARTHUR J. SMITH.